H. F. RICHTER.
MACHINE FOR FORMING HINGE MEMBERS ON BLANKS.
APPLICATION FILED APR. 17, 1913.
1,096,863.
Patented May 19, 1914.
7 SHEETS—SHEET 7.
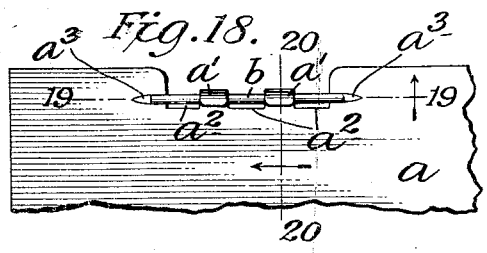
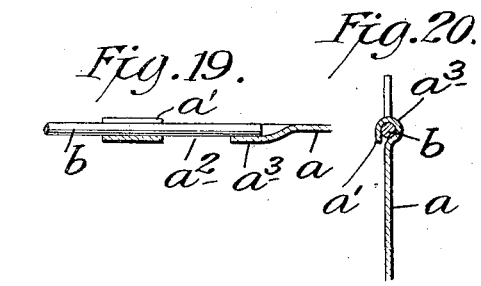
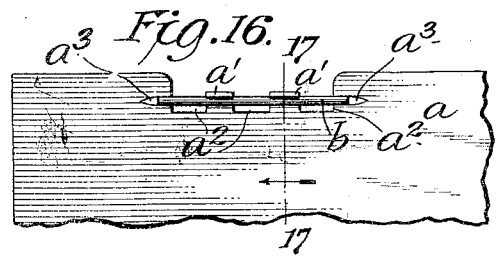
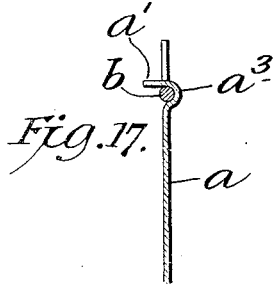
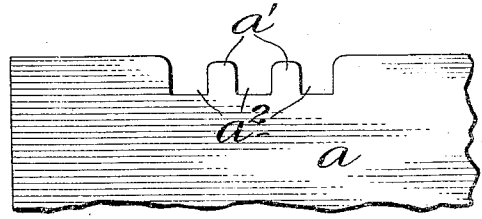
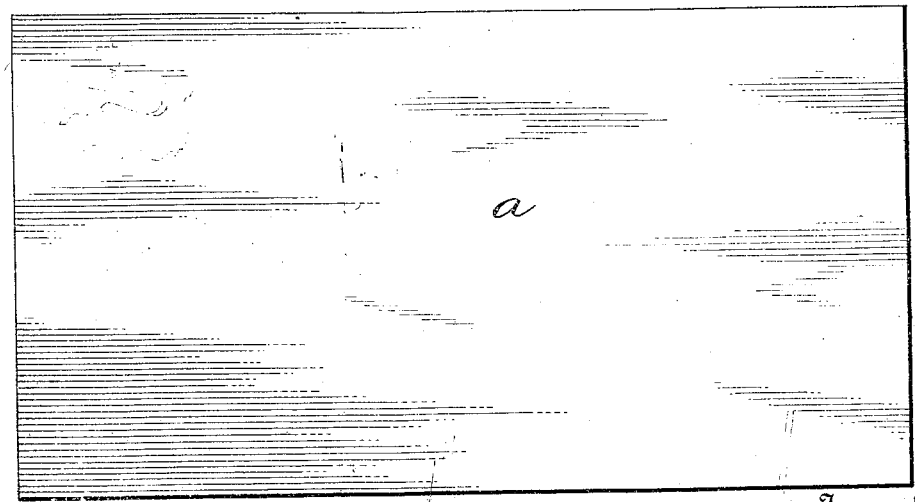
Witnesses
Inventor
Hans F. Richter
By Meyers, Cushman & Rea
Attorneys

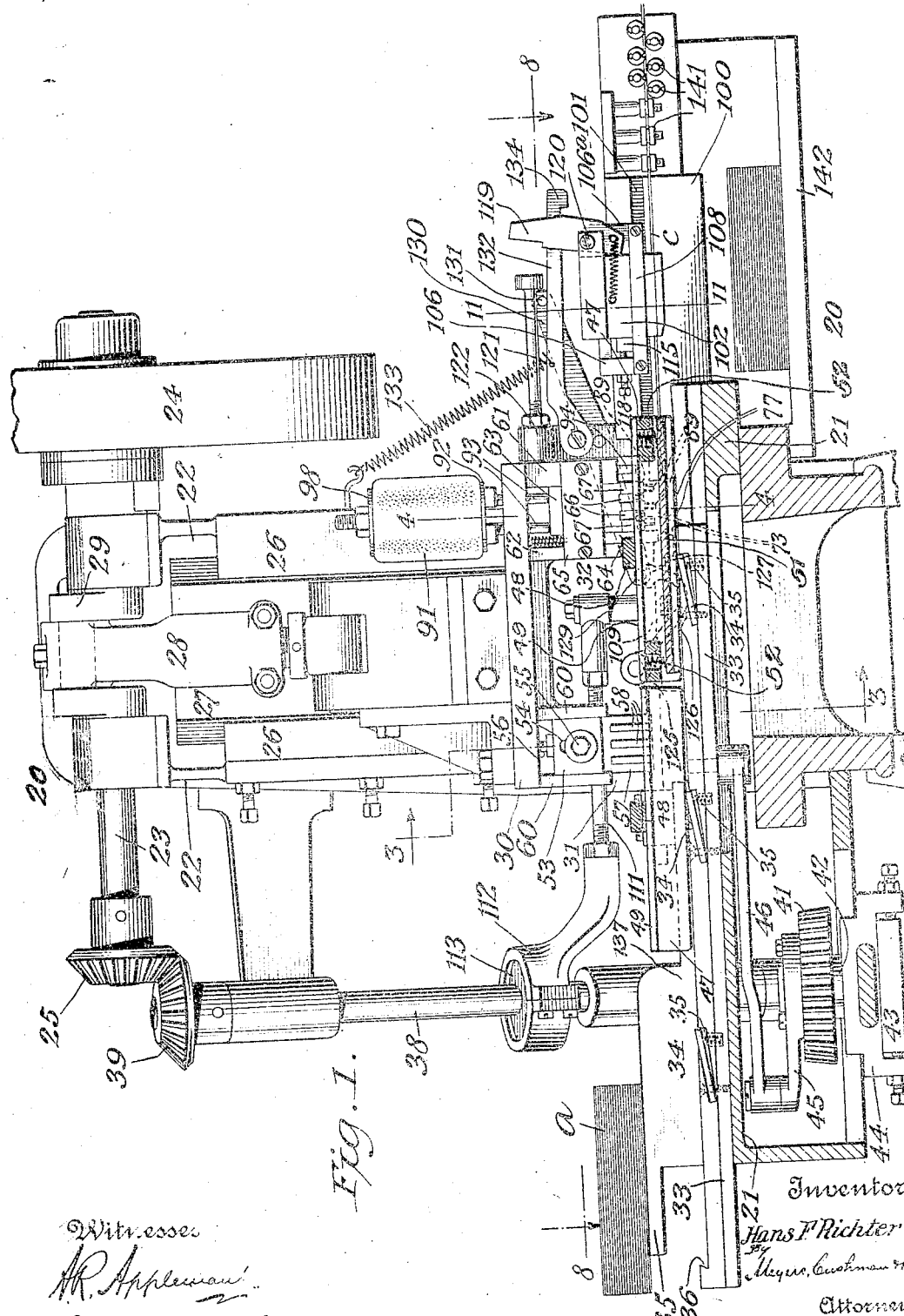

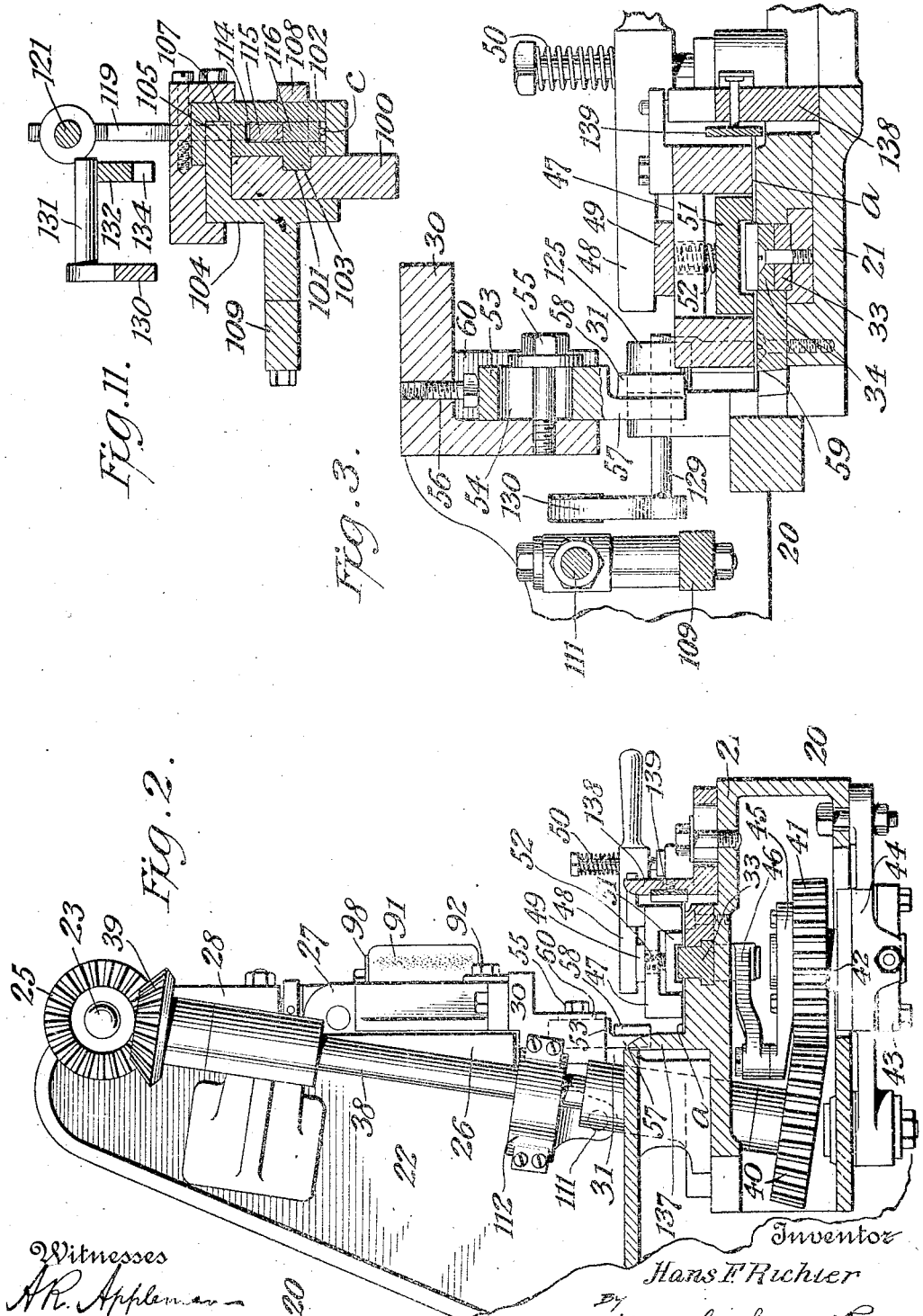

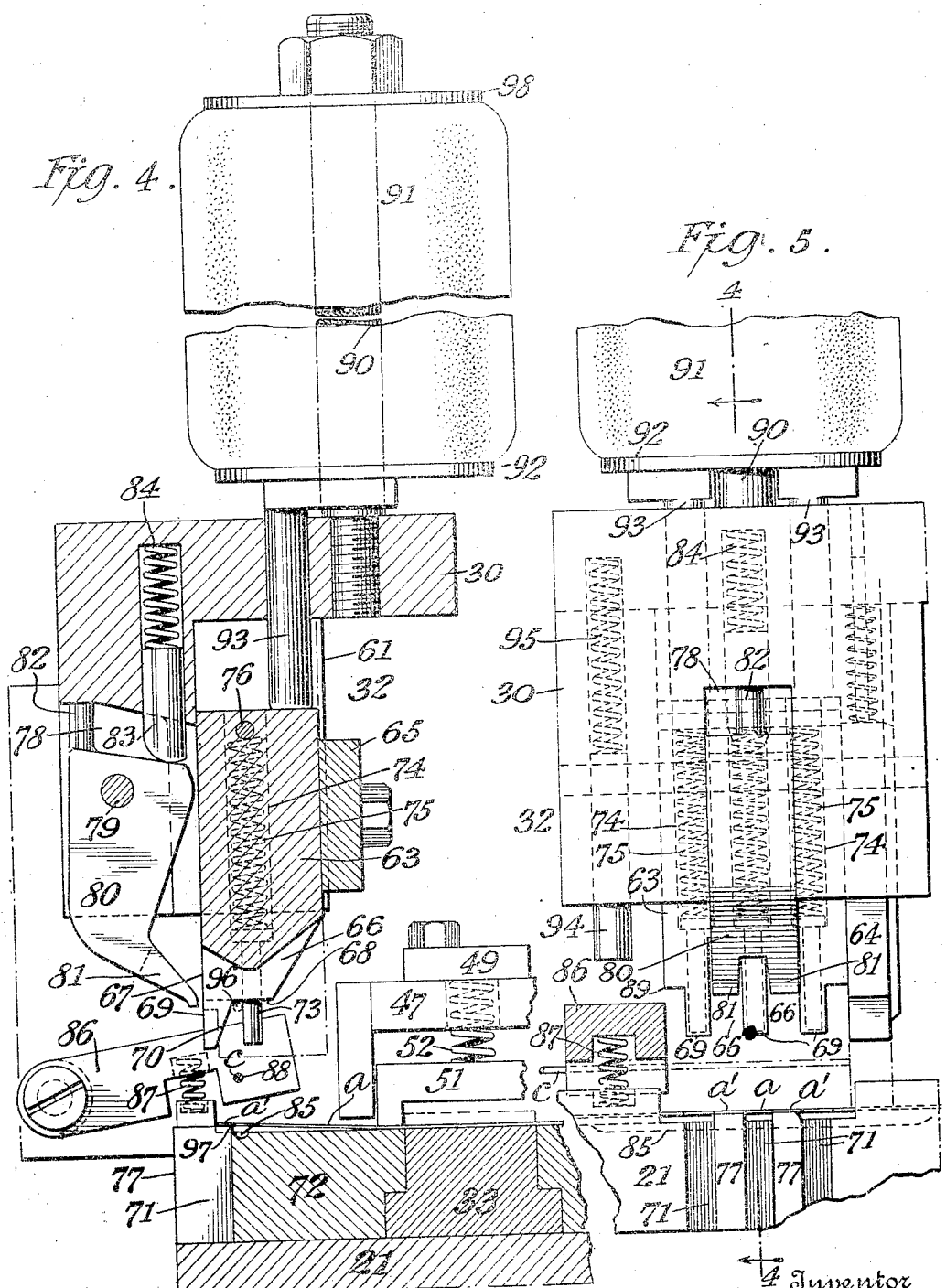

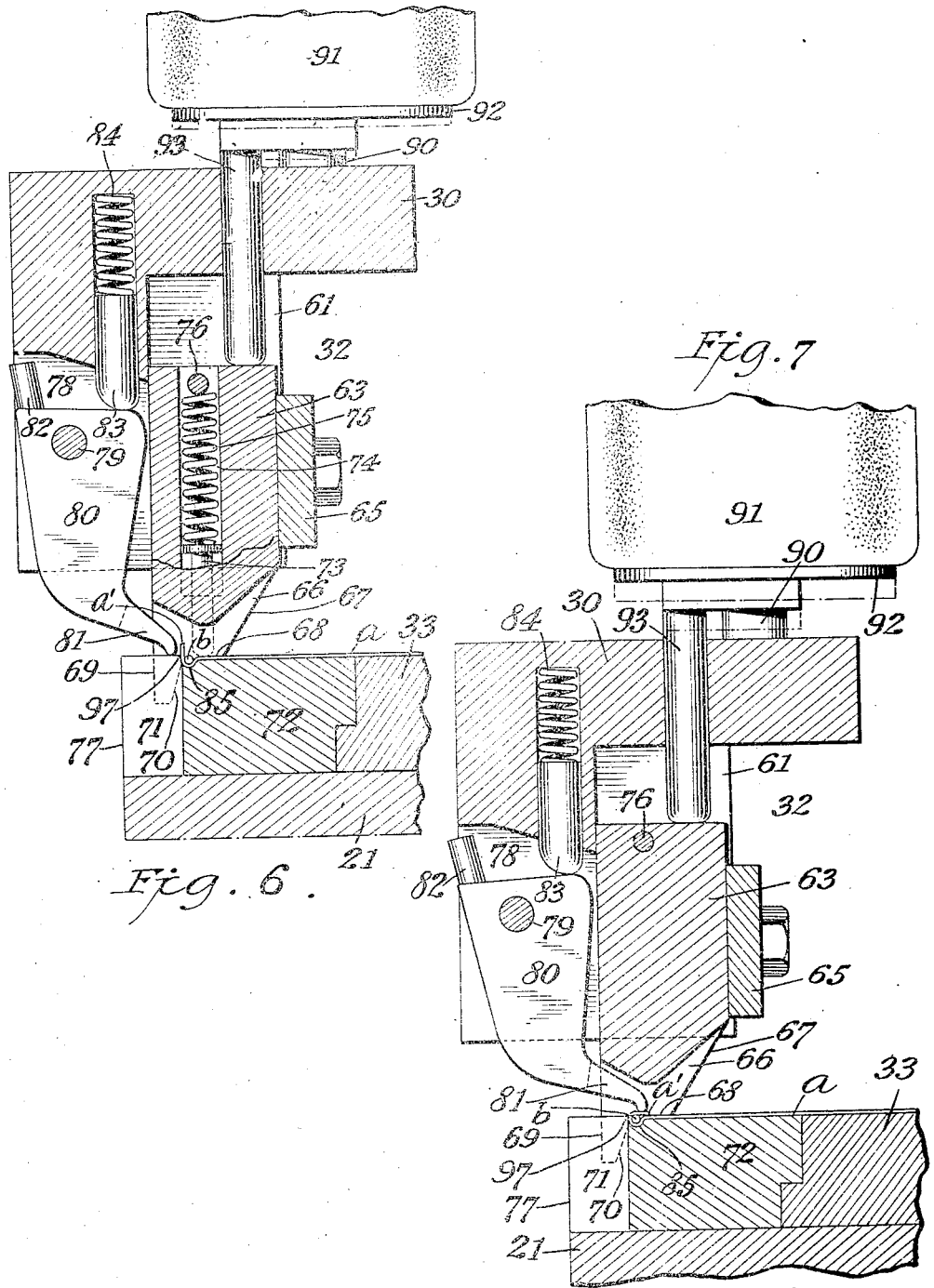

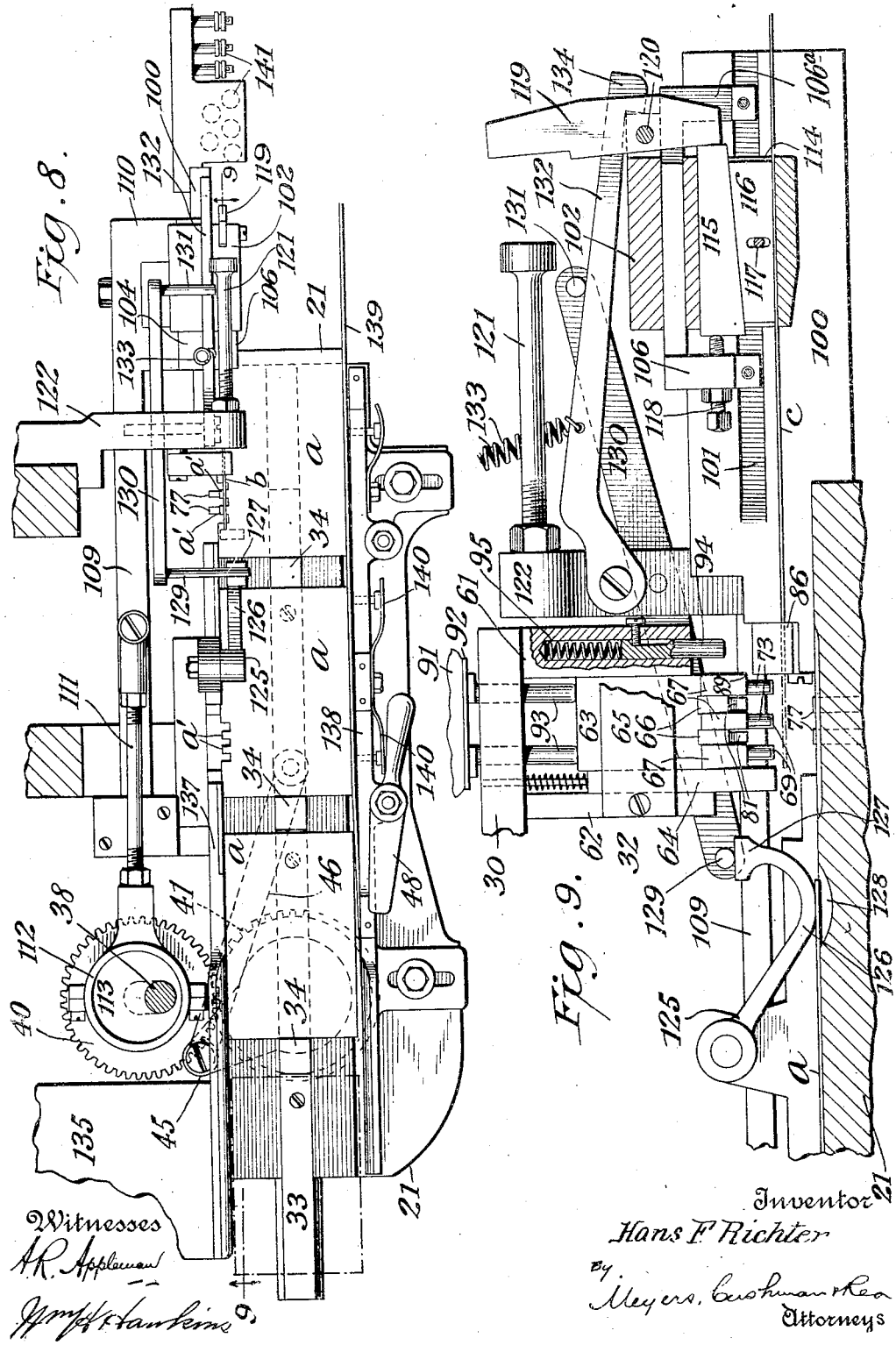

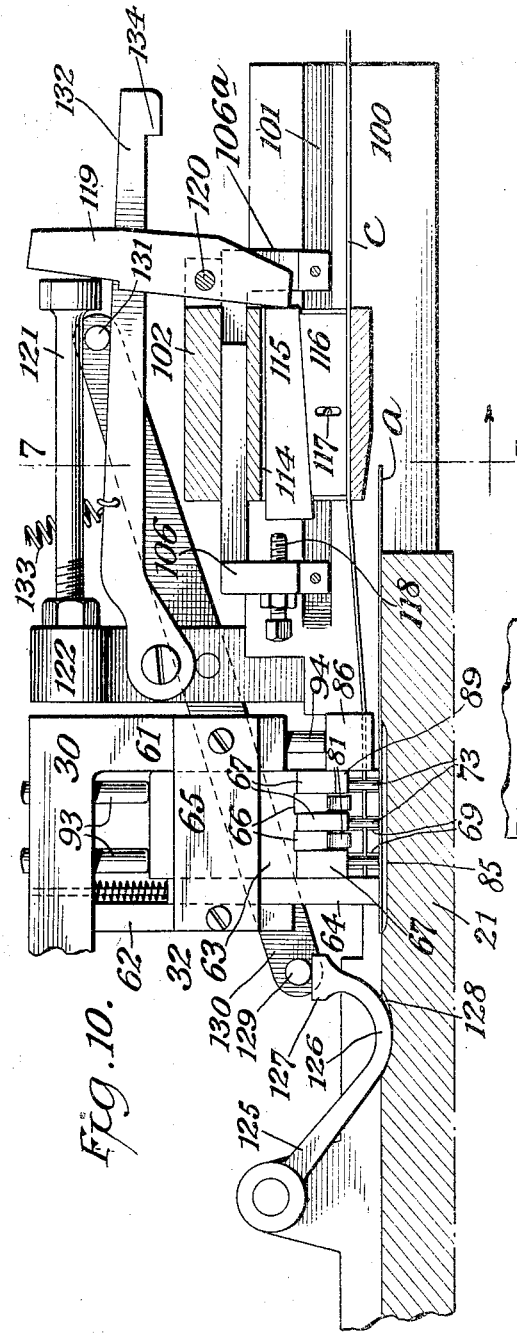
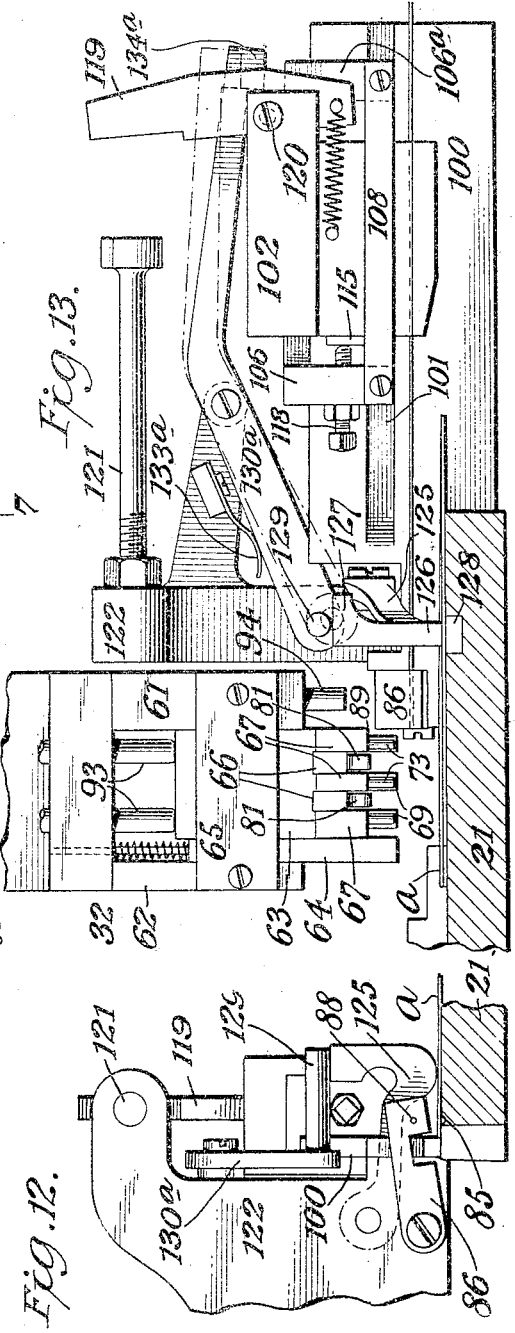

UNITED STATES PATENT OFFICE.

HANS F. RICHTER, OF WINSTON-SALEM, NORTH CAROLINA, ASSIGNOR TO R. J. REYNOLDS TOBACCO COMPANY, OF WINSTON-SALEM, NORTH CAROLINA, A CORPORATION OF NEW JERSEY.

MACHINE FOR FORMING HINGE MEMBERS ON BLANKS.

1,096,863.  Specification of Letters Patent.  Patented May 19, 1914.

Application filed April 17, 1913. Serial No. 761,836.

*To all whom it may concern:*

Be it known that I, HANS F. RICHTER, having renounced my allegiance to the Emperor of Germany and duly declared my intention to become a citizen of the United States, and in this sense a citizen of the United States, residing at Winston-Salem, in the county of Forsyth and State of North Carolina, have invented new and useful Improvements in Machines for Forming Hinge Members on Blanks, of which the following is a specification.

This invention relates to a machine for forming hinge members on sheets of metal and affixing the pivots thereto, as for instance such articles as tin containers or receptacles having hinged covers which are afterward secured to the pivot pins.

One of the objects of the present invention is to provide in such a machine a simple, strong, and positively acting folding mechanism, by means of which a plurality of teeth or lugs cut in one edge of a sheet metal blank are turned over a short length of wire that forms a hinge pintle, the pintle being cut from a continuous length of wire automatically fed into position. The sheets of metal on which the hinge members are formed may have the teeth or lugs cut thereon before placing them in the machine, or they may be formed during the progress of the blank to the folding mechanism.

Another object of the invention is to provide an automatic wire feeding mechanism by means of which a continuous strand of wire is intermittently fed into the machine and short pieces sufficiently long for pintles cut therefrom.

A further object of the invention is directed to means for controlling the wire feeding mechanism by the advancing blank, and is of such a nature that said mechanism is operative only when blanks are being fed to the machine and by the advancing blank upon which a hinge member is about to be formed. If, for any reason, the feeding of the blanks be interrupted the controlling device not being actuated the feeding mechanism will, although continuing its movement, fail to grip the wire, and the latter will not pass into position from which a pintle may be cut.

With these and other objects in view the invention consists in the novel construction, combination, and arrangement of parts hereinafter described in detail and pointed out in the appended claims, reference being had to the accompanying drawings, in which—

Figure 1 is a front elevation of a power press with the invention applied thereto, the parts being shown in initial position. Fig. 2 is a side elevation of the same, partly in section. Fig. 3 is a vertical sectional view on the line 3—3, Fig. 1, showing a means for cutting teeth or lugs upon the blank. Fig. 4 is an enlarged vertical sectional view on the line 4—4, Fig. 1, showing the mechanism for folding the teeth or lugs about the pintle. Fig. 5 is a rear elevation of the parts illustrated in Fig. 4 on the same scale. Figs. 6 and 7 are views similar to Fig. 4, the parts being shown in different positions. Fig. 8 is a horizontal sectional view on the line 8—8, Fig. 1. Figs. 9 and 10 are vertical sectional views on the line 9—9, Fig. 8, showing particularly the wire feed control mechanism. Fig. 11 is a vertical sectional view on the line 11—11, Fig. 1. Figs. 12 and 13 are views illustrating a modified form of wire feed control mechanism, designed to be used when blanks with previously formed teeth or lugs are fed to the machine. Fig. 14 is a plan view of a blank as it appears when fed to the press. Fig. 15 is a partial view of same as it appears after the teeth or lugs are cut on one edge thereof. Fig. 16 is a view showing the lugs partly folded about a hinge pintle. Fig. 17 is a cross sectional view of the same on the line 17—17. Fig. 18 is a view showing the complete folding of the teeth or lugs over the pintle. Fig. 19 is a sectional view of the same on the line 19—19. Fig. 20 is a sectional view on the line 20—20 of the same figure.

Similar reference characters are used to designate the same parts in all the figures.

Referring first to Figs. 14 to 20, inclusive, $a$ indicates a blank on one edge of which a plurality of teeth or lugs $a'$ are to be formed, said lugs being separated from each other and the adjacent edges of the blank by spaces $a^2$, as in Fig. 15. In Figs. 16 and 17 a pintle or hinge pin $b$ is shown in place and seated in a crimp or depression $a^3$ in the plate and the teeth, the latter being bent upwardly at right angles to the plate, as shown, this being the first step in the operation of folding the teeth over the pintles. Figs. 18 to 20 show the blank after the final operation of folding has been performed. Here it will be seen that the upstanding ends of the teeth $a'$ have been bent over upon the pintle and now lie parallel with the blank and close thereto. As thus formed the blank $a$ is ready to receive the hange member which is to be connected thereto.

Referring now to the other figures of the drawing, 20 indicates the frame of the machine, which is made sufficiently strong to carry the parts, and from the top plate 21 of which rises two standards 22 provided at their upper ends with bearings for a driving shaft 23, on one end of which is a belt pulley 24, and at the other end a beveled gear 25, through which power is conveyed to the wire feed mechanism. Slidable in guides 26 on the standards 22 is a plunger or head 27 moved vertically in its guides by a connecting rod 28 pivoted thereto at one end, and at its other end to a crank 29 on the shaft 23.

At or near the lower end of the head or plunger 27 is fixed an angle block 30, which projects laterally beyond the head or plunger, and has secured on its under side at one end adjustable cutters 31 for forming the teeth or lugs on the blank, and at its other end a folding mechanism 32 for turning the teeth thus formed over the hinge pintle. These two mechanisms will be described more in detail hereinafter.

Slidable longitudinally in a groove formed in the bed-plate 21, is a blank feeding bar 33 on the upper side of which is a plurality of feeding dogs 34, which engage the blanks and carry them successively to the punch for cutting teeth, and to the folding mechanism. These dogs 34 are each formed of a straight metal plate seated in a notch in the upper side of the feed bar 33, and held in place by a screw, as shown, the opening in the dog through which the screw passes being sufficiently large to permit the dog to rise and fall. A spring 35 bears on the under side of each dog and holds its free edge a short distance above the upper surface of the feed bar 33, so as to engage the rear edge of the blank and feed the same toward the cutting and folding mechanisms, as the feed bar reciprocates.

Journaled in bearings fixed to the frame at one side is an upright shaft 38 provided at its upper end with a beveled gear wheel 39 engaging with the beveled gear 25 and rotated thereby. On the lower end of the shaft is a gear wheel 40 meshing with a like gear wheel 41 rotatable on a shaft 42 projecting upwardly from adjustable bearing 43 carried in a hanger 44 below the bed-plate. On the shaft 42 is secured a crank 45, which through a connecting rod 46 pivoted at its end respectively to the crank and to the feed bar 33, imparts to the latter the necessary reciprocating motion to feed the blanks to the machine.

The blanks are held upon the bed-plate 21 and against the feeding bar 33 by a series of friction plates 47, which lie above said bar from a point about opposite the shaft 38 to and slightly beyond the bending mechanism 32. There may be two or more of these friction plates which are of inverted U-form, the legs of which bear on the blanks and are held against the same by means of a swinging lever 48 pivoted in front of the friction plates and adapted to press upon a bar 49 extending longitudinally of the series of friction plates and hold the same in place. A spring 50 bears upon the lever 48, which is, therefore, held with a yielding pressure against the bar 49. Within each of the friction plates 47 between the legs thereof is a supplemental friction plate 51 also of inverted U-form, and pressed against the blanks by means of a spring 52 which projects through a hole in the friction plate 47 and bears against the under surface of the pressure bar 49.

The tooth or lug cutting punch 31 hereinabove mentioned comprises a block 53 having an elongated slot 54, through which passes a fastening bolt 55, by means of which the punch may be raised and lowered for adjustment. A bolt 56 screwed into the overhanging flange of the angle plate 30 forms a stop for the punch to prevent it being moved out of position when acting on the blank. The lower end of the punch plate 53 is reduced in thickness as shown at 57, and has projecting from its forward side a number of cutting members 58, which when the punch descends, in connection with a die 59, cut away the metal of the blank to form the teeth or lugs on the edge thereof in the manner shown in Fig. 15. Side plates 60 projecting from the angle plate 30 bear against the sides of the punch block 31, and hold the latter against any lateral movement or swinging about the bolt 55.

Referring now to the bending mechanism 32, 61 and 62 are two cheek plates spaced apart and secured to the under side of the angle plate 30, between which cheek plates are two vertically sliding members, a block 63 by which the teeth or lugs are first bent upwardly, and a wire stop plate 64. These two members are held in place by a plate 65 bearing on their front side, fastened at its ends to the cheek plates 61, 62. This plate holds said members frictionally against the angle plate so that it moves therewith as the head 27 is raised and lowered. The lower end of the block 63 is provided with a plurality of slots 66, which divide said end into a number of dents or serrations 67, which have a downwardly inclined forward edge, and a horizontal lower edge 68. Projecting from the bottom of each dent 67 at its rear edge is a tooth 69 having an inclined forward face 70 as shown. These teeth 69 when the block 63 is lowered enter slots 71 in the bed-plate 21 or a bearing block 72 secured thereon. In front of each tooth and spaced from the base or widest portion thereof, a distance equal to the diameter of the pintle wire is a vertically sliding pin 73 which extends up into the block, and is provided with a head slidable vertically in a bore 74, formed therein and held yieldingly in its lowermost position by a spring 75 in said bore held under tension by means of a cross pin 76, which extends laterally through the block, and above each of the springs 75 that act on the several pins 73. The projecting portions 77 of the bed-plate 21 or the bearing 72 between the groove 71 are made a little higher or extend a short distance above the plane of the bed plate and feeding slide 33, and upon these elevated portions the teeth or lugs $a'$ of the blank rest when the latter is in position to be operated upon by the bending mechanism.

Within a recess 78 in the lower portion of the angle plate 30 is pivotally mounted on a pin 79 a swinging member 80 for giving the final fold to the fingers $a'$ about the pintle $b$. This swinging member is made somewhat broad at its upper end and tapers toward its lower end, from which projects a plurality of toes 81 in a forward direction, which normally lie close to the base of the teeth 69 in line with the spaces therebetween. The backward movement of the member 80 is limited by a stop 82 which bears against the top of the recess 78 while against the front of the broad upper edge of said member, a sliding bolt 83 is held thereagainst by means of a coiled spring 84 seated in a recess in the angle block 30, within which recess the bolt 83 is adapted to slide. The extremities of the toes 81 of the member 80 lie normally in advance of the pivot pin 79, so that when the said member is lowered these extremities, coming into contact with the upper faces of the projections 77, will swing the member inwardly and force the bolt 83 upwardly to compress the spring 84 by means of which the member is returned to its normal position when raised.

Immediately below the space between the pins 73 and the inclined faces of the teeth 69 there is a substantially semi-circular depression 85 made in the upper surface of the bed 21 or guide-block 72 immediately in front of the elevated surfaces of the projections 77. This depression extends laterally a distance equal to, or slightly in excess of the length of the pintle, as shown in Fig. 9.

Pivoted at one end to the main frame 20 is a swinging wire guide 86 normally held elevated by a spring 87 through which guide there extends laterally an opening 88 for the passing of a strand of wire $c$, from which the pintles $b$ are cut. The face of said guide on the side from which the wire emerges is in line with the outer edge of the block 63, which latter has a cutting edge 89 that in connection with the guide 86, serves to sever a length of wire after it has projected through the opening 88 a sufficient distance to form the pintle.

Screwed into the horizontal portion of the angle plate 30 and projecting upwardly therefrom, is a rod 90 on which is mounted a resilient cushion 91 here shown as a rubber block, but which may if desired be a coiled spring or other resilient member. Against the bottom of the rubber cushion 91 bears a plate 92 from which depends two or more pins 93 slidable through openings in the angle plate 30, and bearing at their lower ends against the top of the block 63.

The vertical reciprocation of the head or plunger 27 carries the angle block 30 with it, and also the bending mechanism 32. On the downward movement of the plunger the black 63 descends and the pins 73 and fingers 69 on its lower end straddle the wire $c$, which has been fed into position thereunder, and should said wire be out of alinement the inclined forward face 70 of the fingers will position it by the time the horizontal surfaces 68 of the dents 67 have reached the wire. The wire is now ready to be placed upon the blank $a$. About the time the wire is positioned a pin 94 slidable vertically in the cheek plate 61, and held in downward position by a spring 95, strikes the upper side of the guide 86 and depresses the latter, which then moves in unison with the descent of the head 63, carrying the wire downward toward the blank $a$. As the wire nears the blank the downward movement of the wire carrying guide is arrested, but the block 63 continues until finally its cutting edge 89 passes the opening 88 through which the wire projects and a length sufficient to serve as a pintle is cut therefrom. The continued movement of the head 63 forces the pin 94, bearing on the wire carrying finger 86, to slide into the cheek plate 61, and compress the spring 95 therein. The pintle is now seated at 96, between the pin 73 and the finger 69, and bears against the under surfaces 68 of the dents 67. The pintle also bears against the fingers $a'$ and adjacent edges of the blank $a$. Continued downward movement of the block 63 presses said pintle against the blank and forces the same into the depression 85, forming the crimps $a^3$, Fig. 16. The upstanding corner 97 of the projection 77, at the same time bends the fingers into vertical position, as shown in Figs. 16 and 17. After this has been accomplished the block 63 has reached its lowest limit of movement, but the head or plunger has yet a short distance farther to descend. During this farther movement the block being arrested, the downward movement of the angle plate 30 draws the bar 90 with it, and a plate 98 above the resilient block 91 compresses said rubber cushion between the plates 98 and 92, the latter being prevented from descending farther as the pins 93 bear on the top of the arrested block 63, which holds said pintle firmly within the crimp or depression $a^3$ in the blank $a$. By this time the toes 81 of the member 80 have reached the upper surface of the projections 77, and as the plunger 27 has a slight distance yet to descend the extremity of these toes bearing upon said projections are forced to move in a forward direction, swinging the member 80 on its pivot pin 79, and engaging the upturned fingers $a'$, said toes fold the fingers over the pintle into the position shown in Figs. 18 and 20. The head or plunger now rises and the parts are once more restored to the position shown in Fig. 4.

Fastened to the bed-plate 21, or other portion of the frame work, and projecting therefrom at the right side of the machine, as shown in Fig. 1, is an upright plate 100, in which is formed a horizontal groove 101, which serves as a guide for a carrier 102 of the wire feeding mechanism, said carrier having a rib 103 on its rear face which enters said groove. Lying against the rear side and top edge of the plate 100 is an angle bar 104, the horizontal portion 105 of which is frictionally engaged with a horizontal slot 107 formed in the carrier 102 near its upper edge as clearly shown in Fig. 11. Depending from the horizontal portion 105 of this angle bar are two arms 106 and 106$^a$, to which is fastened the ends of a plate 108 which frictionally engages the front of the carrier 102, and holds it in place against the plate 100. Behind the plate 100 is a horizontally disposed bar 109 from one edge of which project two fingers 110, that are fastened to the angle plate 104. The other end of the bar 109 is pivoted to an eccentric rod 111, on the other end of which is a strap 112 embracing an eccentric 113 on the inclined upright shaft 38.

Longitudinally through the lower portion of the carrier 102 is formed a rectangular opening 114, within which are two wedge-blocks 115, 116, their inclined edges being in contact. The lower wedge-block 116 is held against endwise movement by means of a pin 117, which passes through a vertical slot in the wedge so that it may have a free vertical movement, but cannot move endwise. This wedge-block 116 bears upon the wire strand $c$ which passes through and rests on the bottom of the slot 114. The upper wedge-block 115 is arranged to bear against the top of the slot 114, and projects at its ends beyond the carrier 102. Threaded horizontally in the arm 106 is a bolt 118, held against movement by a jam-nut, the inner end of which bolt is adapted to bear against the wider end of the wedge-block 115, and at suitable times to force said block against its companion block 116 and the latter against the wire strand whereby said strand is clamped and held firmly in the carrier 102. Resting against the narrower end of the wedge block 115 is the lower end of a lever 119 pivoted at 120 to the carrier, the free end of said lever extending upwardly in position to strike a stop pin 121 projecting toward the carrier 102 from a bracket 122 in which said pin is adjustably mounted.

The feed mechanism thus described operates as follows: The rotation of the shaft 38 turns the eccentric and the latter reciprocates the bar 109, which in turn causes the angle plate 104 to move to and from the bending mechanism 32, said angle plate being frictionally connected with the carrier 102; the latter moves with the angle plate unless arrested by some means, whereupon the angle plate will move independently of the carrier. This arresting means is the pin 121, which, as said parts move toward the bending mechanism, will after traveling a certain distance, bring the lever 119 into contact with the end of the pin 121, partly arresting the movement of the carrier without interfering in the least with the movement of the angle block, the latter continuing its movement until it reaches the end of the stroke, which will be only a short distance beyond the point where the carrier 102 was arrested. The carrier does not stop positively, but its movement is much slower than that of the angle plate 104, the result being that the lower end of the lever 119 strikes the upper wedge block 115, and slides it in a direction to loosen the lower wedge block 116 and free wire strand $c$, the bolt 118 in the meantime having been moved away from the wider end of the upper wedge block. The lower wedge block being freed from the pressure of the upper wedge block, the wire is not gripped, and, therefore, the return movement of the carrier does not grip the wire, which latter remains stationary, the carrier moving back to obtain a new grip thereon. If there be no blanks traveling toward the bending mechanism the carrier 102 will vibrate back and forth with the wedge blocks loose so that no wire will be fed, but if a blank is approaching the bending mechanism, the advancing edge of the latter will operate a controlling mechanism and cause the wedges to grip the wire.

The controlling mechanism above noted, comprises a swinging arm 125 pivoted to a bracket projecting up from the bed-plate 21 and hanging downwardly at an angle in the direction of movement of the blank, the free end of said arm being curved, as shown at 126 with its extremity 127 pointed in an upward direction. Normally the curved portion 126 of the arm rests in a depression 128 in the bed-plate, but as the blank $a$ is fed to the bending mechanism its forward edge engages the arm 125, and elevates it from the depression 128, as shown in Fig. 9. This movement of the arm 125 causes its free end 127 to lift a pin 129 on one end of a rocking lever 130 pivoted intermediate its ends to the bracket 122. A pin 131 in the opposite end of the lever 130 depresses a swinging arm 132 also pivoted to the bracket at 122 at one end and normally held elevated by a spring 133. The free end of the arm 132 has a hook-shaped end 134; which when said swinging arm is depressed by the pin 131, as in Fig. 9, lies in the path of retreating movement of the carrier 102, which strikes said hooked end and is held thereby against further movement. The angle plate 104, however, continues its movement, thus bringing the bolt 118 against the wider end of the wedge block 115, and pushes the same in a direction to cause the lower wedge block 116 to bear forcibly upon the wire strand $c$, thus clamping it firmly in the carrier 102. This same movement of the wedge block 115 rocks the lever 119 against the lower end of which the wedge block bears and swings its upper end in position to strike the pin 121 on the next movement of the carrier toward the bending mechanism for the purpose of releasing the wedges from the wire and obtaining a new grip thereon. This operation continues as long as blanks are being fed to the machine. Should there be any interruption in the feeding of blanks to the bending mechanism, the controlling device will remain out of action, thus preventing the wire feed mechanism gripping and advancing the wire strand to the bending mechanism when no blanks are in position thereunder.

A table 135 is provided at the feeding end of the machine upon which is piled a stack of blanks $a$, so as to be convenient to the operator, who places them one at a time upon the feed bar 33, which has a lip 136 on its end to engage the rear edge of the blank and feed the same forward for the first step in the intermittent feeding movement to the bending mechanism. The blanks travel to the bending mechanism between a fixed upright plate 137 at its rear edge, and an adjustable upright plate 138 to guide its forward edge, this plate 138 having attached on its inner face a long flat spring plate 139 against which the edges of the blanks bear, and by which they are held against the rear plate 137, through the medium of springs 140.

Before the wire strand enters the feeding mechanism it passes between a series of staggered straightening rollers 141, whereby all irregularities in the wire are removed, and the latter is fed to the carrier 102 in a perfectly straight condition.

The general operation of the machine is as follows: Power being applied to the pulley 124, the main shaft 23 rotates continuously, and through the proper connections hereinabove described, the head or plunger 27 reciprocates in its guide 26 and the wire feeding mechanism travels to and from the bending mechanism without feeding the wire. When, however, the blanks are placed upon the feed bar 33 they are carried intermittently toward the bending mechanism, first passing below the punch 31, to have the teeth $a'$ cut in one edge thereof, and thence to the bending mechanism. As each blank passes to the bending mechanism it operates the controlling device by first lifting the swinging arm 125 to rock the lever 130 which in turn depresses the lever 132 to bring its hooked end 134 into position to stop the outward travel of the carrier 102. The blank coming to rest beneath the bending mechanism, the latter moves downwardly carrying the pin 94 and wire stop plate 64 with it, bringing said plate in position for the end of the wire to strike, and the pin 94 to bear upon the wire guide 86, swinging the same downward and bringing the projecting end of the wire near the blank. The cutting edge 89 of the block 63 now severs a piece of wire sufficiently long for a pintle, which being guided into position by the fingers 69 and the sliding pins 73, is forced against the blank and its fingers $a'$, to form the crimp $a^3$ therein and turn the fingers into vertical position, as in Fig. 6. The toes 81 of the swinging member 80 then come into play and fold the upstanding ends of the teeth $a'$ over the pintle $b$, as shown in Fig. 7, after which the bending mechanism is raised, the finished blank removed from beneath the same, and a new blank introduced thereunder, the finished blank dropping from the bed-plate 21 onto a table 142.

When blanks have the teeth or lugs $a'$ cut in their edges before being fed to the machine, are to be operated upon, the cutting punch 31 is omitted, and the controlling mechanism slightly changed, as shown in Figs. 12 and 13. Here the blanks $a$ are fed transversely to the machine immediately in front of the bending mechanism 32. The swinging arm 125 in this case is pivoted to the bracket 122 and lies in a direction at right angles to that shown in the preferred form, so that as the blanks are fed to the bending mechanism this swinging arm 125 will be raised in order that its free end 127 may lift the pin 129 of a lever $130^a$, on the outer end of which is a hook $134^a$, similar to the hook 134 on the lever 132, and for a like purpose. Here a flat spring 133ᵃ is used to hold the lever 130ᵃ in its inoperative position with relation to the carrier 102, as shown by dotted lines, Fig. 13.

What I claim is:—

1. In a machine of the character described, a bending mechanism, independent means for consecutively feeding blanks with serrated edges, and pintles to said mechanism for folding said serrations around the pintles, and means positively controlled by the advancing blank for causing said pintle feeding means to become operative.

2. In a machine of the character described, means for consecutively feeding blanks having a serrated edge into said machine, means for intermittently feeding a strand of wire above the serrations, means for cutting lengths from said wire strand to form pintles, and a bending mechanism for folding said serrations around the pintles.

3. In a machine of the character described, means for feeding blanks having teeth or lugs on one edge into said machine, means normally out of operation for feeding wire pintles above said teeth, means for folding said teeth around said pintles, and means controlled by the blank advancing to the folding means for causing said pintle feeding means to become operative.

4. In a machine of the character described, means for consecutively feeding blanks having a serrated edge into said machine, means for intermittently feeding a strand of wire over said blanks, means for cutting lengths from said wire strand to form pintles and pressing the same upon the blank to crimp and partly fold said serrations around the pintles, and means for completing the folding of said serrations.

5. In a machine of the character described, means for consecutively feeding blanks having teeth on one edge into said machine, means for feeding a strand of wire above the teeth of said blanks, means for cutting said wire into lengths to form pintles, means for pressing said pintles upon the blanks and teeth to crimp the same and partly fold said teeth around the pintles, means for completing the folding of said teeth, and means actuated by the advancing blank for causing the wire feed mechanism to clamp and feed the wire strand.

6. In a machine of the character described, means for feeding blanks having a serrated edge into said machine, means normally out of operation for feeding a strand of wire above said serrated edges, means for cutting said wire strand into lengths to form pintles, means for pressing a pintle against the blank to crimp the same and the serrations, means for folding said serrations around said pintle, and means controlled by the advancing blank for causing said pintle feeding means to become operative.

7. In a machine of the character described, means for consecutively feeding blanks into said machine, means for forming teeth or lugs on one edge of said blanks, means for intermittently feeding a strand of wire above the teeth or lugs, means for cutting lengths from said wire strand to form pintles, and means for folding said teeth around the pintles.

8. In a machine of the character described, means for consecutively feeding blanks into said machine, means for forming teeth or lugs on one edge of each of said blanks, means for feeding wire pintles above said teeth, means for folding said teeth around said pintles, and means controlled by the blank advancing to the folding mechanism for causing said pintle feeding means to become operative.

9. In a machine of the character described, means for consecutively feeding blanks into said machine, means for cutting teeth on one edge of each of said blanks, means for uninterruptedly feeding a strand of wire over said blanks, means for cutting lengths from said wire strand to form pintles and pressing the same upon the blanks to crimp and partly fold said teeth around the pintles, and means for completing the folding of said teeth.

10. In a machine of the character described, means for consecutively feeding blanks into said machine, means for cutting teeth on one edge of each of said blanks, means for feeding a strand of wire above the teeth to said blanks, means for cutting said wire into lengths to form pintles, means for pressing said pintles upon the blank and teeth to crimp the same and partly fold said teeth around the pintles, means for completing the folding of said teeth, and means actuated by the blank advancing to the bending mechanism for causing the wire feed mechanism to clamp and feed the wire strand.

11. In a machine of the character described, means for feeding blanks into said machine, means for cutting teeth in one edge of each of said blanks, means for feeding a strand of wire above said teeth, means for cutting said wire strand into lengths to form pintles, means for pressing said pintles against the blanks to crimp the same and the teeth and turn said teeth at right angles to the blank, means for completing the folding of said teeth around said pintles, and means controlled by the blank advancing to the folding mechanism for causing said pintle feeding means to become operative.

12. In a machine of the character described, means for feeding thereinto blanks having teeth or lugs on one edge, means for feeding pintles above said teeth, and successively operating means for folding said teeth around said pintles.

13. In a machine of the character described, means for consecutively feeding blanks thereinto, means for forming teeth or lugs on one edge of said blanks, means for feeding pintles above said teeth, and successively operating means for folding said teeth around said pintles.

14. In a machine of the character described, means for consecutively feeding thereinto blanks having teeth or lugs on one edge, means for feeding a strand of wire above said teeth, and a vibrating bending mechanism provided with means for cutting lengths from said strand of wire to form pintles and folding said teeth around said pintles.

15. In a machine of the character described, means for consecutively feeding blanks thereinto means for feeding a strand of wire above the blank, a reciprocating plunger provided with a cutter for forming teeth or lugs on one edge of said blank, mechanism for cutting lengths from said wire to form pintles and folding said teeth or lugs around said pintles, and means controlled by the advancing blanks for rendering the wire feeding mechanism operative.

16. In a machine of the character described, the combination of blank feeding mechanism, a cutter for forming teeth or lugs on one edge of said blank, mechanism for feeding wire to the teeth to form pintles, a reciprocating plunger for partly folding the teeth about the pintles, and a second folding member pivoted on the plunger for completing the folding of the fingers.

17. In a machine of the character described, the combination of blank feeding mechanism, a cutter for forming teeth or lugs on one edge of said blank, mechanism for feeding wire to the teeth to form pintles, a support for the toothed edge of the blank provided with a depression below the teeth thereof, a reciprocating plunger for pressing the pintle upon the teeth and adjacent portions of the blank to crimp the same and partly folding the teeth about the pintles, and a second folding member pivoted on the plunger for completing the folding of the fingers.

18. In a machine of the character described, the combination of blank feeding mechanism, a cutter for forming teeth or lugs on one edge of said blank, mechanism for feeding wire to the teeth to form pintles, a support for the toothed edge of the blank provided with a depression below the teeth thereof, and elevated portions on which the teeth rest, a reciprocating plunger having depending guide fingers and pins for directing the pintles into position to be pressed against the blank to crimp the same and the fingers and partly fold said fingers around the pintles, and a second folding member pivoted on the plunger for completing the folding of the fingers.

19. In a machine of the character described, having a blank feeding means and a pintle feeding means, combined with a blank support having a depression therein and elevated portions in rear of said depression upon which teeth on the blank rest, a reciprocating plunger for pressing said pintle upon the teeth and adjacent portions of the blank to press said parts into the depression and crimp the same and to partly fold the teeth around the pintle, and a second folding member pivoted to the plunger for completing the folding of the fingers.

20. In a machine of the character described, having a blank feeding means and a pintle feeding means, combined with a blank support having a depression therein and elevated portions in rear of said depression upon which teeth on the blank rest, a reciprocating plunger for pressing said pintle upon the teeth and adjacent portions of the blank to press said parts into the depression and crimp the same and to partly fold the teeth around the pintle, a second folding member pivoted to the plunger for completing the folding of the fingers, and guiding fingers and pins on the plunger for directing and holding the pintle in position above said depression.

21. In a machine of the character described, the combination of a blank feeding means, a wire strand feeding mechanism normally disconnected from the wire strand, and means controlled by the advancing blanks for causing said wire feeding mechanism to clamp and feed the wire.

22. In a machine of the character described, the combination of a blank feeding means, a wire strand feeding mechanism normally disconnected from the wire strand, a swinging lever adapted to be raised by an advancing blank, and connections between said lever and the wire feeding mechanism for causing the latter to clamp and feed the wire.

23. In a machine of the character described, the combination of a blank feeding mechanism, pintle feeding mechanism, mechanism for folding the blank around said pintle, and means wholly controlled by the blank advancing to the folding mechanism for causing said pintle feeding mechanism to feed a pintle to the blank.

24. In a machine of the character described, the combination of a blank feeding mechanism, pintle feeding mechanism, a punch for cutting teeth on one edge of said blank, mechanism for folding said teeth around said pintle, and means wholly controlled by the blank advancing to the folding mechanism for causing said pintle feeding mechanism to feed a pintle to the blank.

25. In a machine of the character described, a blank supporting bed having elevated portions for supporting teeth or lugs on one edge of said blank and a depression at the base of said elevated portions, means for pressing a pintle on said teeth to crimp the same and partly fold them about the pintle, and means for completing the folding of the teeth.

26. In a machine of the character described, a blank supporting bed having elevated portions for supporting teeth or lugs on one edge of said blank and a depression at the base of said elevated portions, means for pressing a pintle on said teeth and adjacent parts of the blank and into said depression to crimp the same and partly fold the teeth about the pintle, said pressing means having depending guide fingers and pins for holding said pintle in proper relation to said teeth, and means for completing the folding of the teeth.

27. In a machine of the character described, a blank supporting bed having elevated portions for supporting teeth or lugs on one edge of said blank and a depression at the base of said elevated portions, means for feeding a wire strand through a movable guide to said teeth, means for depressing said guide and cutting a length of wire therefrom to form a pintle, means for pressing said teeth and adjacent parts of the blank into said depression to crimp the same and partly fold the teeth about the pintle, said pressing means having depending guide fingers and pins for holding said pintle in proper relation to said teeth, and means for completing the folding of the teeth.

28. In a machine of the character described, bending mechanism for folding teeth or lugs on a blank about a pintle, said binding means comprising a blank supporting bed having a depression therein, a movable head having a slotted lower end for pressing a pintle on said teeth and the latter into the depression in the bed to crimp said teeth and partly fold the same, and a swinging member carried by the movable head to engage the partly folded teeth and complete the folding of the same.

29. In a machine of the character described, bending mechanism for folding teeth or lugs on a blank about a pintle, said bending mechanism comprising a blank supporting bed having a depression therein, a movable head having a slotted lower end for pressing a pintle on said teeth and the latter into a depression in the bed to crimp said teeth and partly fold the same, fixed depending guide fingers on said movable head, and guide pins telescoping into said head for maintaining said pintle in proper relation to the teeth, and a swinging member carried by said movable head having forwardly projecting toes which contact with the supporting bed and are moved thereby to complete the folding of the teeth around the pintle.

30. In a machine of the character described, bending mechanism for folding a blank around a pintle, means for successively feeding blanks to the bending mechanism, means for feeding pintles to the bending mechanism above the blank, means for causing said pintle feeding means normally out of operation to become operative, and means in the path of and controlled by the blank advancing to the bending mechanism for actuating the means by which the pintle feed is made operative.

31. In a machine of the character described, mechanism for feeding blanks thereinto, means for feeding a strand of wire above said blank, said means being normally inoperative, means for cutting a pintle from said wire strand, means for folding said blank about said pintle, a stop movable into the path of the wire feeding means to cause the same to clamp the wire for feeding it, means controlled by the blank advancing to the bending mechanism for moving said stop into the path of the wire feeding means, and means for releasing said wire after feeding a length sufficient for a pintle.

32. In a machine of the character described, means for feeding a strand of wire thereto to form pintles, said means comprising a holder, a wire clamping device carried thereby, means positively reciprocated upon which said holder is frictionally supported and by means of which it is moved, a stop on the positively reciprocated means for operating the wire clamping device to grip the wire, means on the holder for disconnecting said wire clamping device, and a stop movable into the path of travel of said holder to arrest the same and permit the positively reciprocating means to actuate the wire gripping device.

33. In a machine of the character described, means for feeding blanks successively thereinto, means for feeding a strand of wire to the blanks to form pintles, said wire feeding means comprising a holder, a wire clamping device carried thereby, means positively reciprocated upon when said holder is frictionally supported and by means of which it is moved, a stop on the positively reciprocated means for operating the wire clamping device to grip the wire, means on the holder for disconnecting said wire clamping device, a stop movable into the path of travel of said holder to arrest the same and permit the positively reciprocating means to actuate the wire gripping device, and means controlled by the advancing blanks for moving said stop into position to arrest the holder.

34. In a machine of the character described, means for feeding a strand of wire thereto to form pintles, comprising means positively and constantly reciprocated, a holder frictionally mounted upon said reciprocating means and movable thereby, wire clamping wedges carried by said holder, means on said reciprocating means for actuating said wedges to grip and advance the wire, means carried by the holder contacting with a fixed part of the machine to release the grip of the wedges on the wire at the end of each feeding reciprocation, and a stop movable in the path of travel of the holder to arrest the same and permit the positively reciprocating means to actuate the wire gripping device.

In testimony whereof I have hereunto set my hand in presence of two subscribing witnesses.

HANS F. RICHTER.

Witnesses:
  LEWIS F. BROWN,
  MATT SMITH.